(No Model.)

P. CONVER.
NUT LOCK.

No. 250,503. Patented Dec. 6, 1881.

WITNESSES

INVENTOR
Peter Conver
by W. B. Richards Attorney.

N. PETERS, Photo-Lithographer, Washington, D. C.

UNITED STATES PATENT OFFICE.

PETER CONVER, OF FARMINGTON, ILLINOIS, ASSIGNOR OF ONE-HALF TO JOHN F. WALLACE, OF SAME PLACE.

NUT-LOCK.

SPECIFICATION forming part of Letters Patent No. 250,503, dated December 6, 1881.

Application filed August 1, 1881. (No model.)

*To all whom it may concern:*

Be it known that I, PETER CONVER, a citizen of the United States, residing at Farmington, in the county of Fulton and State of Illinois, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to means for fastening bolt-nuts in place, to prevent them becoming loose by jarring or tremulous motion received from machinery, passing railway-trains, &c.; and the invention consists in a nut with a projection on one side, in which a dog is seated and adapted to be forced inward and into contact with the bolt by a cam-washer for the purpose of locking the nut, as hereinafter described.

Figure 1:
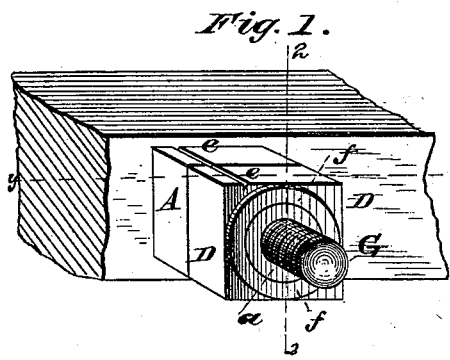
Figure 2:
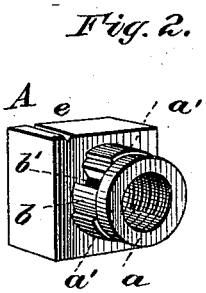
Figure 3:
Figure 4:
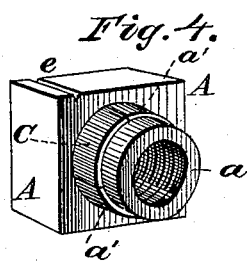
Figure 5:
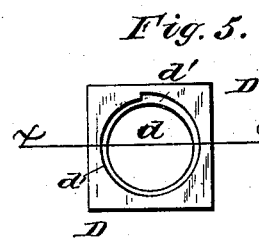
Figure 6:
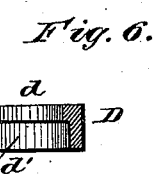
Figure 7:
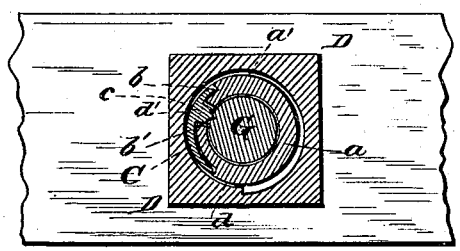
Figure 8:
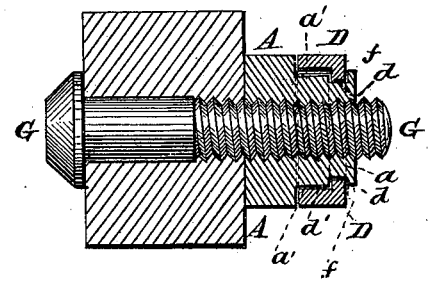

In the accompanying drawings, which illustrate my invention, Figure 1 is a perspective of mechanism by which I attain the objects of my invention. Fig. 2 is a perspective of the nut alone. Fig. 3 is a perspective of the dog. Fig. 4 is a perspective of the nut with the dog in place therein. Fig. 5 is a plan of the washer. Fig. 6 is a section of the washer in the line $x$ $x$ in Fig. 5. Fig. 7 is a sectional elevation, in line $y$ $y$ in Fig. 1. Fig. 8 is a sectional elevation in line 2 2 in Fig. 1.

Referring to the drawings by letters, the same letter indicating the same part in the different figures, letter A represents a nut, with a boss or portion, $a$, extended around its aperture. The hole through the boss $a$ is preferably threaded, same as the nut. The part of the boss $a$ next the nut is slightly enlarged, as shown at $a'$, Fig. 2, and has a depression, $b$, in said enlarged part, as shown more plainly at Fig. 7. Near one end of the depression $b$ is a hole, $b'$, through the wall of the boss $a$.

C is an arc-shaped plate laid loosely in the depression $b$, and has a dog, $c$, which projects through the hole $b'$.

D is a washer or locking-plate, and has a central hole which is circular at one side of the plate $d$, and adapted to fit the smaller outer end of the boss $a$. The hole at the other side of the washer D is formed eccentric, or with a cam-surface, $d'$, as shown at Fig. 5.

The dog C is placed in position, as hereinbefore described, and the washer D is then placed on the boss $a$ over the dog C. A slight flange, $f$, is then turned outward by any ordinary means on the outer end of the boss, which flange, while it holds the washer in place on the boss, does not prevent the washer being rotated thereon. The washer and nut have each a groove, $e$, in one side, and when these respective grooves are coincident the nut may be screwed down tightly on a bolt by turning both nut and washer together. After the nut is screwed down close as desired, it is locked by simply turning the washer D until its eccentric portion comes over the dog C and forces it into the threads of the bolt. To release the nut from the bolt, it is only necessary to turn the washer to bring the respective grooves $e$ coincident, when nut and washer may be turned simultaneously, and the sides of the dog C being inclined, it will rise out of its depression in the threads of the bolt and permit unscrewing the nut.

What I claim as new is—

In combination with a nut having a projecting boss and a dog seated in an opening through such boss, a washer or lock fitted on said boss and provided with a cam-surface which is used to force the dog into the threads of the bolt by turning the washer, substantially as and for the purpose specified.

In testimony whereof I affix my signature in presence of two witnesses.

PETER CONVER.

Witnesses:
 AMASA CLARK,
 ALFRED STEENBURG.